(12) United States Patent
Noguchi

(10) Patent No.: US 8,027,631 B2
(45) Date of Patent: Sep. 27, 2011

(54) SONG PRACTICE SUPPORT DEVICE

(75) Inventor: Akane Noguchi, Hamamatsu (JP)

(73) Assignee: Yamaha Corporation (JP)

( * ) Notice: Subject to any disclaimer, the term of this patent is extended or adjusted under 35 U.S.C. 154(b) by 239 days.

(21) Appl. No.: 12/307,178

(22) PCT Filed: Jun. 29, 2007

(86) PCT No.: PCT/JP2007/063512
§ 371 (c)(1),
(2), (4) Date: Jan. 29, 2009

(87) PCT Pub. No.: WO2008/004641
PCT Pub. Date: Jan. 10, 2008

(65) Prior Publication Data
US 2009/0317783 A1    Dec. 24, 2009

(30) Foreign Application Priority Data
Jul. 5, 2006    (JP) .................. 2006-185987

(51) Int. Cl.
*A63H 5/00* (2006.01)
(52) U.S. Cl. .................. 434/307 A; 84/609; 84/650
(58) Field of Classification Search .............. 434/307 A, 434/308, 169; 84/609–610, 649–650
See application file for complete search history.

(56) References Cited

U.S. PATENT DOCUMENTS

| | | | |
|---|---|---|---|
| 4,591,928 A * | 5/1986 | Bloom et al. ......... | 704/E21.017 |
| 5,847,303 A | 12/1998 | Matsumoto | |
| 6,301,992 B1 | 10/2001 | Paparoni | |
| 7,271,329 B2 * | 9/2007 | Franzblau ............ | 84/609 |
| 7,825,321 B2 * | 11/2010 | Bloom et al. ......... | 84/622 |
| 2005/0049875 A1 | 3/2005 | Kawashima et al. | |

(Continued)

FOREIGN PATENT DOCUMENTS

JP    5-165484 A    7/1993

(Continued)

OTHER PUBLICATIONS

International Preliminary Report on Patentability (Chapter 1) and Written Opinion of the International Searching Authority issued in corresponding PCT application No. PCT/JP2007/063512, dated Jan. 29, 2009.

(Continued)

*Primary Examiner* — Kathleen Mosser
(74) *Attorney, Agent, or Firm* — Rossi, Kimms & McDowell LLP

(57) ABSTRACT

A technique of enabling a singer to auditorily recognize how to change the way of singing is provided. The CPU (11) of a karaoke device (1) associates model voice data stored in a model voice data storage area (14c) with inputted learner voice data in a time axis direction. Then the CPU (11) shifts the pitch of the learner voice data so that it may coincide with the corresponding pitch of the model voice data according to the result of the association, compresses or extends the section (mora) of the learner voice data in the time axis direction so that the section length of the learner voice data coincides with the corresponding section length of the model voice data, and outputs the resultant learner voice data to a voice processing section (18). The voice processing section (18) converts the learner voice data supplied from the CPU (11) into an analog signal and generates the sound from a loudspeaker (19).

3 Claims, 7 Drawing Sheets

U.S. PATENT DOCUMENTS

2009/0306987 A1* 12/2009 Nakano et al. ................ 704/260

FOREIGN PATENT DOCUMENTS

| JP | 10-268877 A | 10/1998 |
| JP | 2001-117568 A | 4/2001 |
| JP | 2001-117582 A | 4/2001 |
| JP | 2001-117599 A | 4/2001 |
| JP | 2004-144867 A | 5/2004 |
| JP | 2005-128372 A | 5/2005 |

OTHER PUBLICATIONS

International search report issued in corresponding PCT/JP2007/063512, dated Sep. 18, 2007.

* cited by examiner

SONG PRACTICE SUPPORT DEVICE

This application is a U.S. National Phase Application of PCT International Application PCT/JP2007/063512 filed on Jun. 29, 2007 which is based on and claims priority from JP 2006-185987 filed on Jul. 5, 2006, the contents of which is incorporated herein in its entirety by reference.

TECHNICAL FIELD

The present invention relates to a song practice support device.

BACKGROUND ART

In karaoke devices, various methods for scoring the singing skill of a singer have recently been proposed. For example, a method is proposed in Japanese Laid-open Patent Publication No. 2005-128372, in which a pitch is extracted from voice data representative of a user voice signal on a predetermined frame basis, and the pitch extracted on a frame basis is compared with a tone pitch of song data, whereby the accuracy of the pitch of the user's voice is determined. A karaoke device of this type for scoring the singing skill is generally configured to display on a screen a score indicating a result of scoring.

It is also useful for a singer to recognize, by sound, how to correct which part of his/her singing. However, with the conventional scoring method in which the score is simply displayed, the singer cannot recognize, by sound, how to change which part of singing. This also applies to musical instrument performance other than singing a song.

This invention has been created under the above described background, and its object is to provide a technique of enabling a singer to auditorily recognize how to change the way of singing.

DISCLOSURE OF INVENTION

To attain the above object, according to a first aspect of this invention, there is provided a song practice support device comprising association means for associating model voice data stored beforehand and input learner voice data with each other in a time axis direction, pitch shift means for shifting a pitch of the learner voice data so as to be coincident with a corresponding pitch of the model voice data in accordance with a result of association by the association means, time stretching means for compressing or extending a predetermined section of the learner voice data in the time axis direction so that a section length thereof is made to coincide with a corresponding section length of the model voice data in accordance with the result of association by the association means, and output means for outputting to sound emission means the learner voice data shifted in pitch by the pitch shift means and compressed or extended in the time axis direction by the time stretching means.

In the first aspect of this invention, preferably, the song practice support device includes storage means for storing delimiter information representative of delimiter positions defining predetermined sections of the model voice data in the time axis direction, section length ratio calculation means for associating the model voice data with the learner voice data on a section basis in accordance with the delimiter information stored in the storage means and the result of association by the association means and for calculating, on a section basis, a ratio between the section length of the model voice and the section length of the learner voice, and correspondence point identification means for identifying, on a frame basis with a frame having a predetermined time length, correspondence points between the model voice and leaner voice for respective sections in accordance with the ratio calculated by the section length ratio calculation means, wherein the pitch shift means shifts the pitch of the learner voice represented by the input voice data so as to be coincident with the corresponding pitch of the model voice in accordance with a result of identification by the correspondence point identification means.

In the first aspect of this invention, preferably, in accordance with the result of identification by the correspondence point identification means, the pitch shift means shifts the pitch of learner voice in respect of a frame in which the pitch of learner voice corresponding to the pitch of model voice is detected, so as to be coincident with the corresponding pitch of the model voice, and the pitch shift means interpolates between the pitches of frames close to a frame in which the pitch of the learner voice is not detected, to thereby determine the pitch of that frame.

To attain the object, according to a second aspect of this invention, there is provided a control method for a song practice support device comprising an association step of associating model voice data stored beforehand and input learner voice data with each other in a time axis direction, a pitch shift step of shifting a pitch of the learner voice data so as to be coincident with a corresponding pitch of the model voice data in accordance with a result of association in the association step, a time stretching step of compressing or extending a predetermined section of the learner voice data in the time axis direction so that a section length thereof is made to coincide with a corresponding section length of the model voice data in accordance with the result of association in the association step, and an output step of outputting to sound emission means the learner voice data shifted in pitch in the pitch shift step and compressed or extended in the time axis direction in the time stretching step.

In the second aspect of this invention, preferably, the control method includes a storage step of storing delimiter information representative of delimiter positions defining predetermined sections of the model voice data in the time axis direction, a section length ratio calculation step of associating the model voice data with the learner voice data on a section basis in accordance with the delimiter information stored in the storage step and the result of association in the association step and of calculating, on a section basis, a ratio between the section length of the model voice and the section length of the learner voice, and a correspondence point identification step of identifying, on a frame basis with a frame having a predetermined time length, correspondence points between the model voice and learner voice for respective sections in accordance with the ratio calculated in the section length ratio calculation step, wherein in the pitch shift step, the pitch of the learner voice represented by the input voice data is shifted so as to be coincident with the corresponding pitch of the model voice in accordance with a result of identification in the correspondence point identification step.

In the second aspect of this invention, preferably, in accordance with the result of identification in the correspondence point identification step, the pitch of learner voice in respect of a frame in which the pitch of learner voice corresponding to the pitch of the model voice is detected is shifted in the pitch shift step so as to be coincident with the corresponding pitch of the model voice, and the pitches of frames close to a frame in which the pitch of the learner voice is not detected are interpolated to thereby determine the pitch of that frame.

To attain the object, according to a third aspect of this invention, there is provided a program for causing a computer to execute a control method for controlling a song practice support device, the control method comprising an association step of associating model voice data stored beforehand with input learner voice data in a time axis direction, a pitch shift step of shifting a pitch of the learner voice data so as to be coincident with a corresponding pitch of the model voice data in accordance with a result of association in the association step, a time stretching step of compressing or extending a predetermined section of the learner voice data in the time axis direction so that a section length thereof is made to coincide with a corresponding section length of the model voice data in accordance with the result of association in the association step, and an output step of outputting to sound emission means the learner voice data shifted in pitch in the pitch shift step and compressed or extended in the time axis direction in the time stretching step.

BEST MODE FOR CARRYING OUT THE INVENTION

Figure 1:
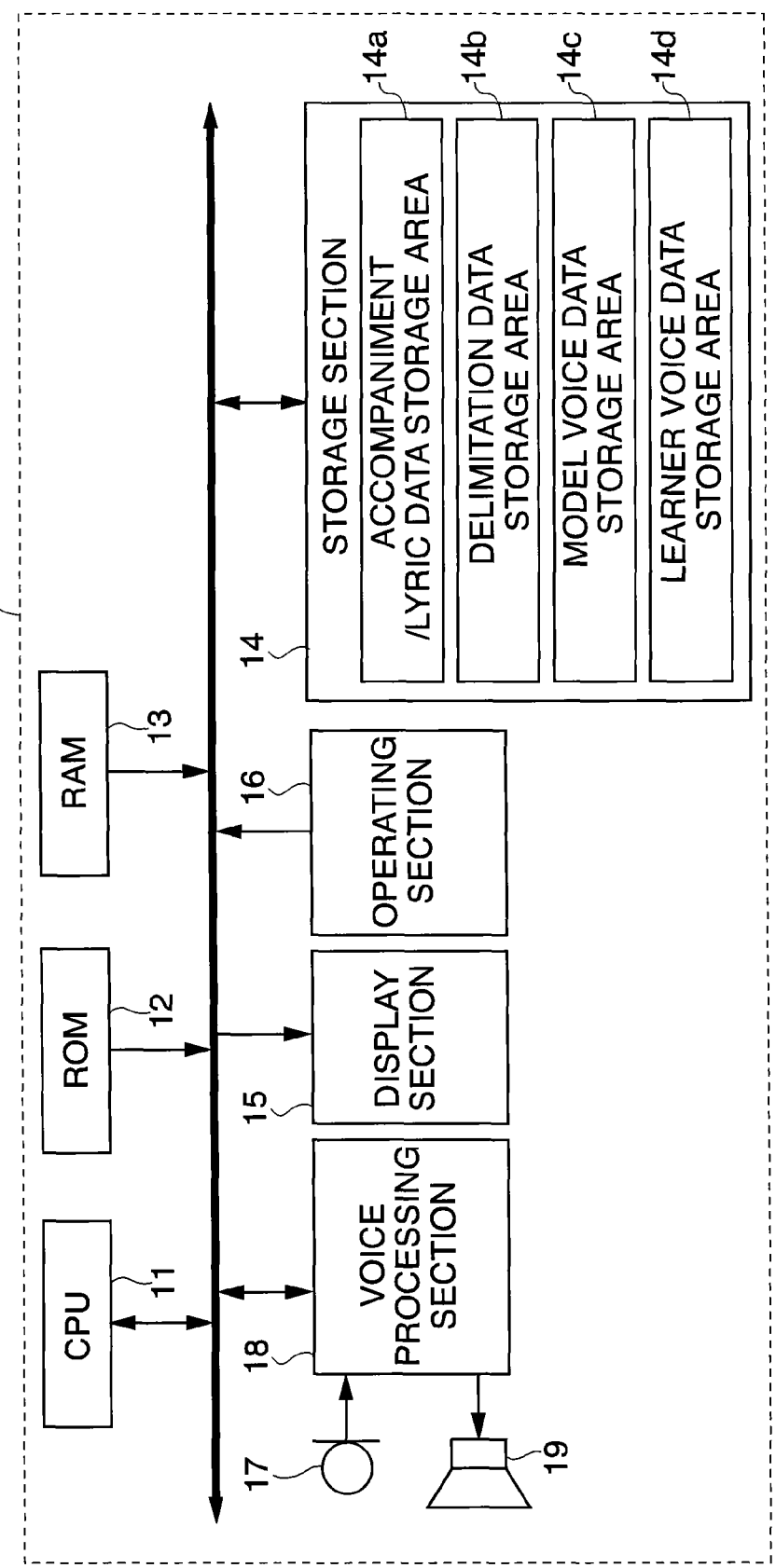
FIG. 1 is a block diagram showing an example hardware construction of a karaoke device.

In the following, the best mode for carrying out this invention will be described.
<A: Construction>
FIG. 1 shows in block diagram an example hardware construction of a karaoke device 1, which is as a song practice support device of one embodiment of this invention. A CPU (Central Processing Unit) 11 reads out a computer program stored in a ROM (Read Only Memory) 12 or in a storage section 14, loads the program into a RAM (Random Access Memory) 13, and executes the program to control various sections of the karaoke device 1. The storage section 14 is comprised of a large-capacity storage means such as for example a hard disk, and includes an accompaniment/lyric data storage area 14a, a delimitation data storage area 14b, a model voice data storage area 14c, and a learner voice data storage area 14d. A display section 15 is comprised of a liquid crystal display or the like, and displays under the control of the CPU 11 various screens such as a menu screen for manipulation of the karaoke device 1 and a karaoke screen on which a lyric telop is displayed superposed on a background image. The operating section 16 includes various keys, and outputs a signal corresponding to a depressed key to the CPU 11. A microphone 17 picks up a voice vocalized by a learner, and outputs a voice signal (analog data). A voice processing section 18 converts the voice signal (analog data) output from the microphone 17 into digital data, and outputs the digital data to the CPU 11. A loudspeaker 19 emits a voice output from the voice processing section 18.

The accompaniment/lyric data storage area 14a of the storage section 14 stores accompaniment data that represents performance sounds of various musical instruments for accompaniments each played in synchronism with the progress of a song, and stores, in association with the accompaniment data, lyric data representing lyrics of songs. The accompaniment data are in a data format such as for example MIDI (Musical Instruments Digital Interface) format, and the desired accompaniment data is reproduced when a karaoke song is sung by a learner. The lyric data is displayed in the form of a lyric telop on the display section 15 when a karaoke song is sung.

The model voice data storage area 14c stores voice data (hereinafter referred to as the model voice data) which is for example in a WAVE format or an MP3 (MPEG1 Audio Layer-3) format and which represents a voice sung by a singer (hereinafter referred to as the model voice) with accompaniment represented by accompaniment data.

The delimitation data storage area 14b stores delimitation data that represents delimiter positions between syllables (sections) contained in the model voice which is represented by the model voice data stored in the model voice data storage area 14c. In this embodiment, the delimitation data is comprised of information that represents start times of sections. The learner voice data storage area 14d of the storage section 14 stores voice data in time series in a WAVE format or an MP3 format, together with information representing the time elapsed from the start of accompaniment. This voice data is obtained by the voice processing section 18 by performing A/D conversion of voice data from the microphone 17. The voice data represents a voice of the learner (hereinafter referred to as the learner voice), and is hereinafter referred to as the learner voice data.

Figure 2:
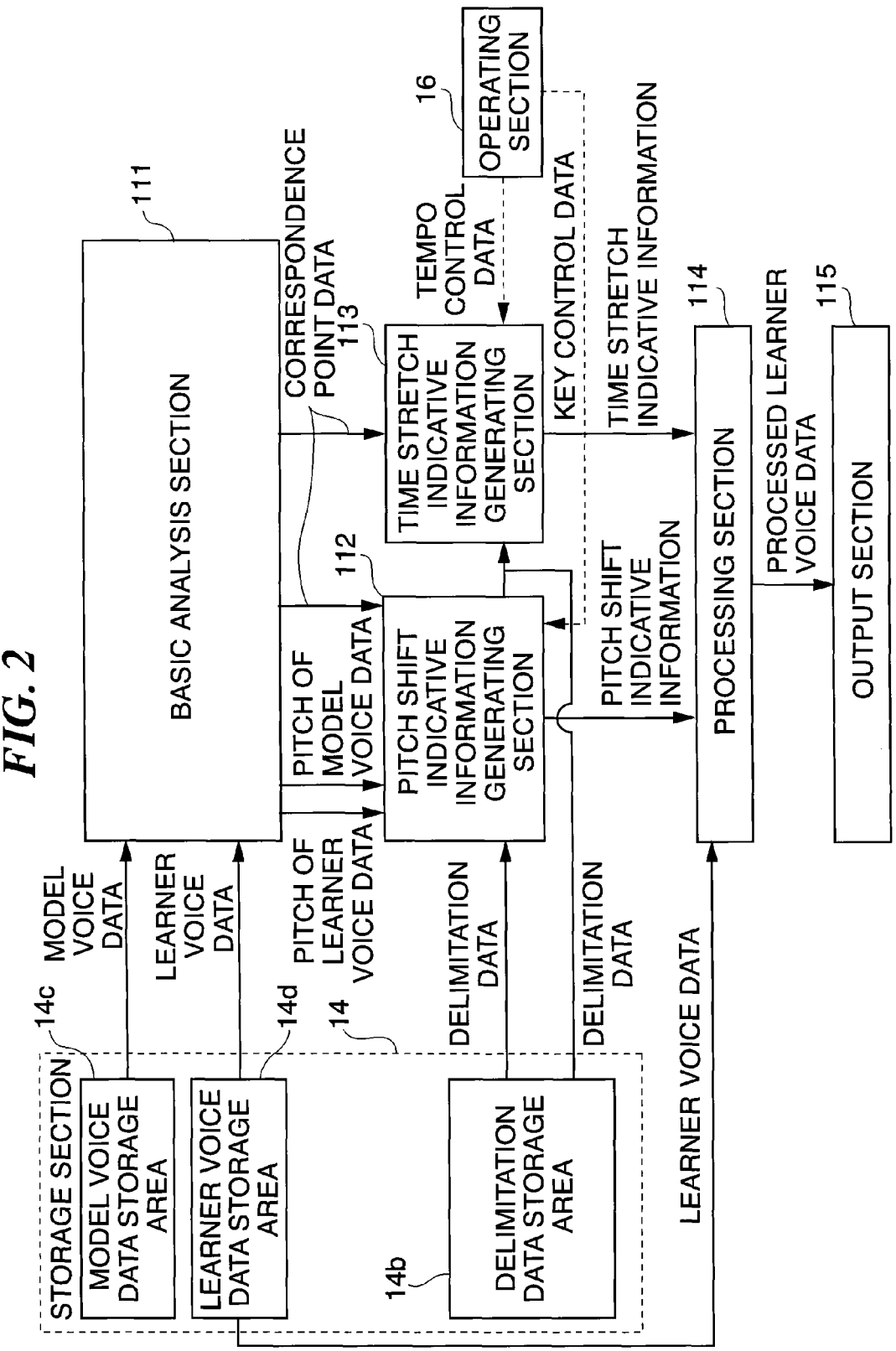
FIG. 2 is a block diagram showing an example software construction of the karaoke device.

Next, the software construction of the karaoke device 1 is described with reference to a block diagram in FIG. 2. There are shown in FIG. 2 a basic analysis section 111, a pitch shift indicative information generating section 112, a time stretch indicative information generating section 113, a processing section 114, and an output section 115, which are realized by the CPU 11 by executing the computer program stored in the ROM 12 or in the storage section 14. In FIG. 2, the flow of data is schematically shown by arrows.

In FIG. 2, the basic analysis section 111 detects, on a frame basis with the frame having a predetermined time length, a pitch and a spectrum of the model voice data read from the model voice data storage area 14c and a pitch and a spectrum of the learner voice data read from the learner voice data storage area 14d. To detect the spectrums, an FFT (Fast Fourier Transform) is used. The pitch of the model voice data and the pitch of the learner voice data, which are detected by the basic analysis section 111, are output to the pitch shift indicative information generating section 112.

The basic analysis section 111 determines a correspondence relation between the model voice data and the learner voice data based on the detected spectrums. There is a possibility that the model voice and the learner voice are deviated from each other in terms of time. In a case for example that the learner sings a song at wrong timing or the model singer intentionally shifts the timing of start or end of singing, a deviation is produced between the model voice and the learner voice in terms of time. To associate the model voice and the learner voice with each other even if there is a deviation therebetween in terms of time, time-normalization (DTW: Dynamic Time Warping) is carried out to extend and compress the time axis of the learner voice data so as to be coincident with the time axis of the model voice. As a technique for performing the DTW, DP (Dynamic Programming) is used in this embodiment. Specifically, the following processing is carried out.

Figure 3:
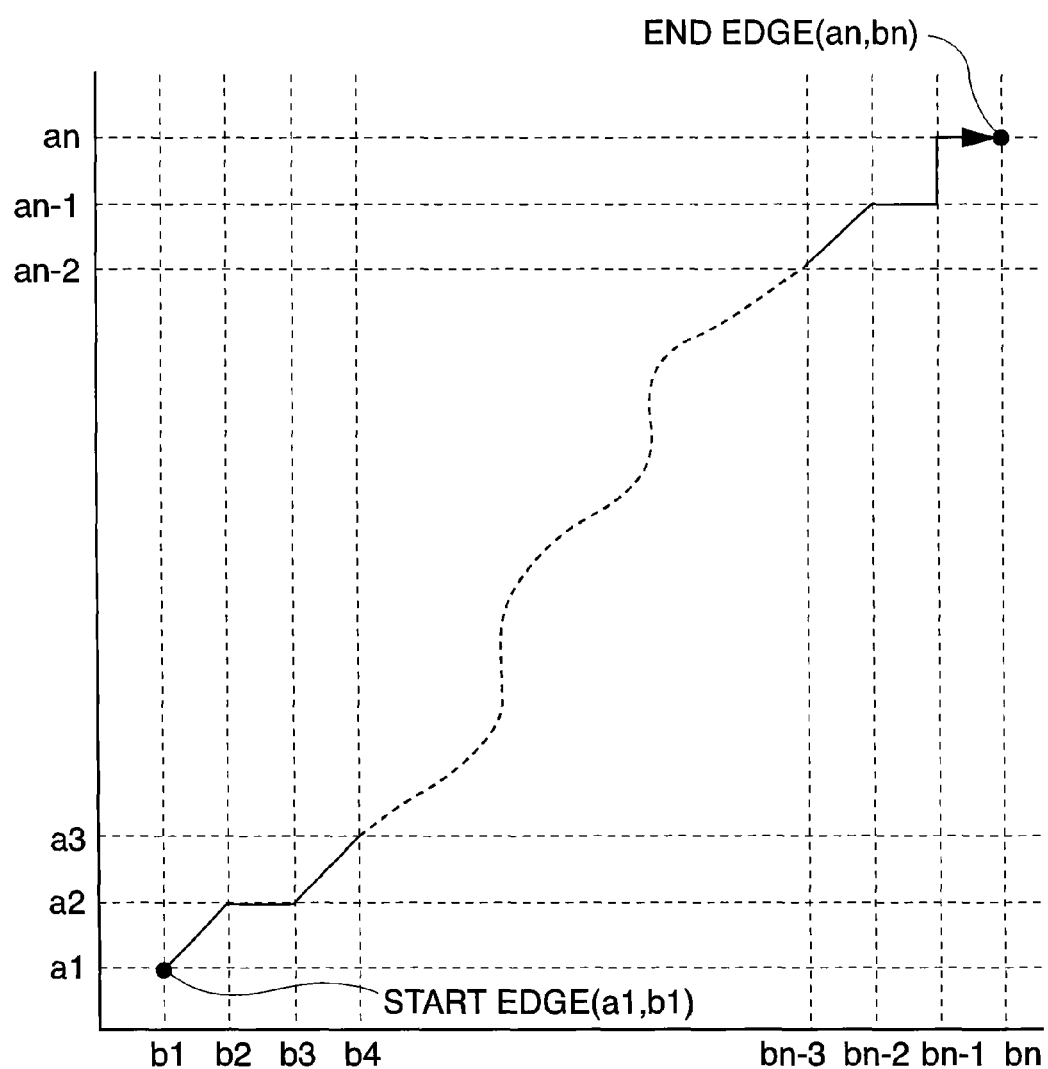
FIG. 3 is a view showing DP matching.

The basic analysis section 111 produces a coordinate plane as shown in FIG. 3 (hereinafter referred to as the DP plane) on the RAM 13. The ordinate axis of the DP plane corresponds to parameters each obtained by performing an inverse Fourier transform on a logarithm of an absolute value of the spectrum of the corresponding frame of the model voice data. The abscissa axis corresponds to parameters (cepstrums) each obtained by performing an inverse Fourier transform on a logarithm of an absolute value of the spectrum obtained from the corresponding frame of the learner voice data. In FIG. 3, a1, a2, a3, . . . , an denote frames of the model voice data which are arranged along the time axis, and b1, b2, b3, . . . , bn denote frames of the learner voice data arranged along the time axis. Intervals between a1, a2, a3, . . . , an along the ordinate axis correspond to time lengths of frames, and intervals between b1, b2, b3, . . . , bn along the abscissa axis correspond to time lengths of frames. DP matching scores, i.e., Euclidean distance values of parameters a1, a2, a3, . . . and b1, b2, b3, . . . are associated with lattice points on the DP plane. For example, the Euclidean distance value of the parameter obtained from a first frame among a series of frames of the model voice data and the Euclidean distance value of the parameter obtained from a first frame among a series of frames of the leaner voice data are associated with the lattice point defined by a1 and b1. After the DP plane having the above structure is formed, the basic analysis section 111 searches all the paths each extending from a lattice point (start edge) defined by a1, b1 to a lattice point (end edge) defined by an, bn, accumulates the DP matching scores of all the lattice points between the start edge and the end edge of each of the searched paths, and determines the minimum accumulated value. The path having the minimum accumulated value of the DP matching scores is taken into consideration as a scale of extension and compression. The scale is used when the time axis of each frame of the learner voice data is extended or compressed so as to be coincident with the time axis of the model voice data.

The basic analysis section 111 identifies, on the DP plane, the path having the minimum accumulated value of the DP matching scores, and carries out alignment processing to extend and compress the time axis of the learner voice data in accordance with the content of the identified path. Specifically, the time-stamp content of each frame of the learner voice data is rewritten such that Euclidean distances of parameters obtained from frames which are at the same position along the time axis are represented by DP matching scores at lattice points on the identified path on the DP plane. Then, frames which are the same in position along the time axis are paired and associated with one another. For example, in the case of the path on the DP plane in FIG. 3, it is understood that the path extends from a starting point defined by a1, b1 to a lattice point defined by a2, b2 and located on the upper right side of the starting point. Since the position of the frame of b2 along the time axis is originally the same as the position of the frame of a2, it is unnecessary to rewrite the time-stamp content of the frame of b2. It is also understood that the path extends from the lattice point defined by a2, b2 to a lattice point defined by a2, b3 and located on the right side of the former. Since both the positions of the frames of b2, b3 along the time axis must be made equal to the position of the frame of a2 along the time axis, the time stamp of the frame of b3 is replaced by the time stamp of the immediately preceding frame. As a result, the frame of a2 and the frames of b2, b3 are associated with one another as a group of frames which are the same in position along the time axis. The replacement of time stamps and the association of frames are carried out over all the frame sections b1 to bn. Thus, even if vocalization timing of the learner voice is deviated from that of the model voice, frames (phonemes) which are the same in position along the time axis after the alignment can be associated with one another.

In the above, the mechanism of the DP matching has been described.

Figure 4:
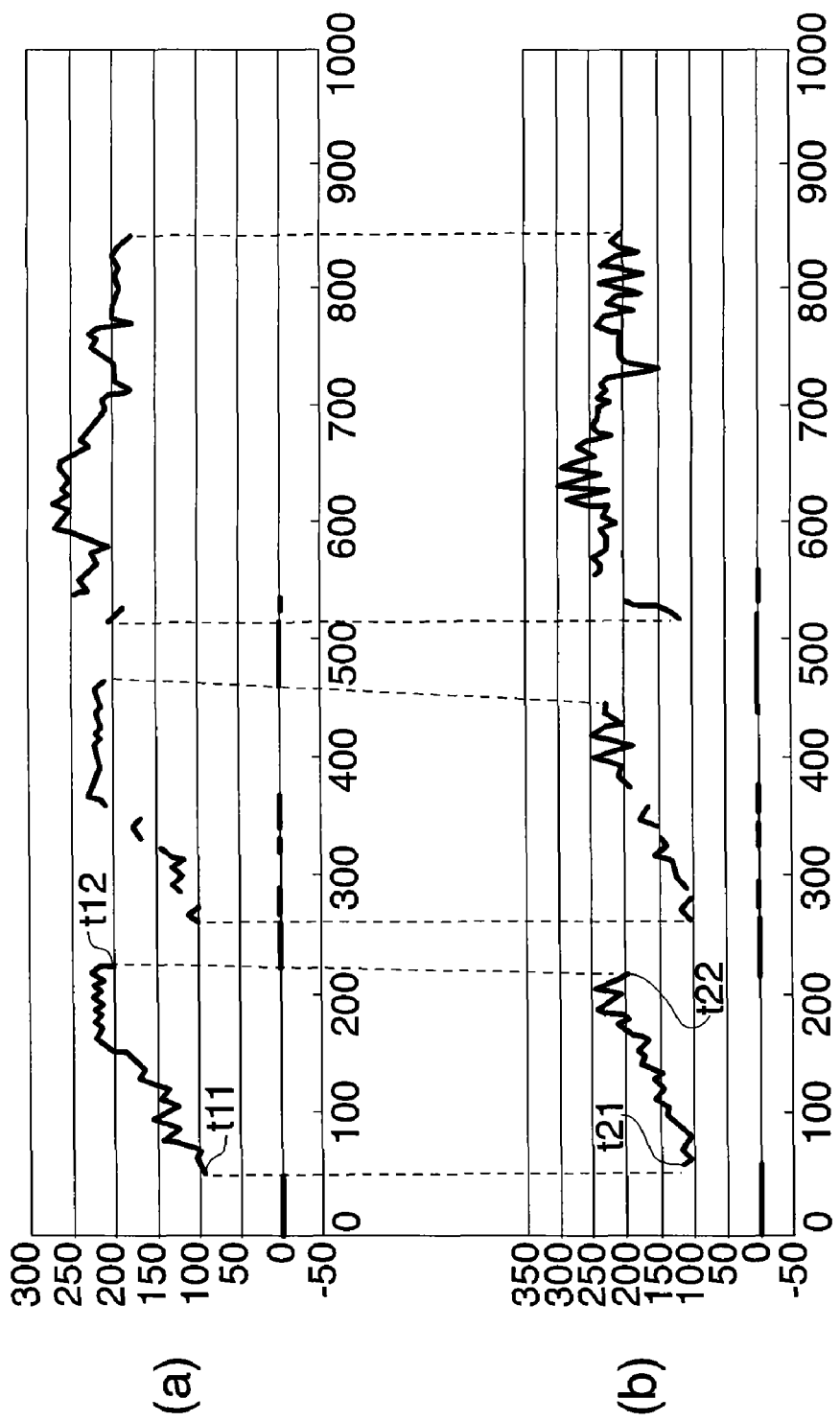
FIG. 4 is a view showing an example relation between model voice and learner voice.

FIG. 4 shows an example of the association of the learner voice with the model voice. Portion (a) of FIG. 4 is an example graph showing a time-based change in the pitch of the learner voice, and portion (b) of FIG. 4 is an example graph showing a time-based change in the pith of the model voice. FIG. 4 shows a state where vocalization timing t11 of the learner voice is associated with vocalization timing t21 of the model voice, and vocalization timing t12 of the learner voice is associated with vocalization timing t22 of the model voice.

Correspondence points detected by the basic analysis section 111 are output to the pitch shift indicative information generating section 112 and to the time stretch indicative information generating section 113.

On the basis of the pitch of the model voice data, the pitch of the learner voice data, the correspondence points between the model voice and the learner voice, and the delimitation data, the pitch shift indicative information generating section 112 generates pitch shift indicative information that represents a pitch difference between the pitch of the learner voice data and the corresponding pitch of the model voice data. The pitch shift indicative information generated by the section 112 is output to the processing section 114.

On the basis of the correspondence points detected by the basic analysis section 111 and the delimitation data, the time stretch indicative information generating section 113 generates time stretch indicative information that represents the degrees to which frames are to be time-stretched. The time stretch indicative information generated by the section 113 is output to the processing section 114.

The processing section 114 shifts the pitch of the learner voice data based on the pitch shift indicative information generated by the section 112, and performs time stretch processing on the learner voice data based on the time stretch indicative information generated by the section 113, thereby generating processed learner voice data. The processed learner voice data generated by the processing section 114 is output to the output section 115.

The output section 115 outputs the processed learner voice data generated by the processing section 114 to the voice processing section 18.

<B: Operation>

Next, the operation of the karaoke device 1 is described with reference to FIG. 5.

The learner manipulates the operating section 16 of the karaoke device 1 to select a song which the learner wishes to sing, and gives an instruction to reproduce the song. The operating section 16 outputs to the CPU 11 a signal corresponding to the manipulation content. In response to the signal supplied from the operating section 16, the CPU 11 starts karaoke accompaniment (step S1). Specifically, the CPU 11 reads out accompaniment data from the accompaniment/lyric data storage area 14a, and supplies the accompaniment data to the voice processing section 18. The voice processing section 18 converts the accompaniment data into an analog signal, and supplies the analog signal to the loudspeaker 19 for sound emission. The CPU 11 also reads out lyric data from the accompaniment/lyric data storage area 14a, and causes the display section 15 to display a lyric telop. The learner sings to the accompaniment emitted from the loudspeaker 19. The learner's voice is picked up by the microphone 17, converted into a voice signal, and output to the voice processing section 18. The learner voice data after the A/D conversion by the voice processing section 18 is stored (recorded) in time series into the learner voice data storage area 14d, together with information indicative of the time elapsed from the start of the accompaniment (step S2).

Upon completion of the reproduction of the accompaniment data, the CPU 11 performs the processing of the basic analysis section 111 on the learner voice data stored in the learner voice data storage area 14d and on the model voice data stored beforehand in the model voice data storage area 14c. More specifically, the CPU 11 calculates the pitch and spectrum of the learner voice data on a frame basis with the frame having a predetermined time length (step S3), and calculates the pitch and spectrum of the model voice data on a frame basis with the frame having a predetermined time length (step S4). Next, based on the spectrum of the model voice and that of the learner voice, the CPU 11 makes the time axis of the learner voice data and that of the model voice data coincident with each other, and associates voices, which are at the same time axis position, with one another to thereby detect correspondence points between the learner voice data and the model voice data (step S5).

Next, the CPU 11 performs the processing of the pitch shift indicative information generating section 112. Specifically, the CPU 11 generates pitch shift indicative information based on the pitch of the model voice data, the pitch of the learner voice data, the correspondence points between the model voice and the learner voice, and the delimitation data (step S6).

In the following, the details of the pitch shift indicative information generating process in the step S6 are described with reference to a flowchart in FIG. 6.

Figure 6:
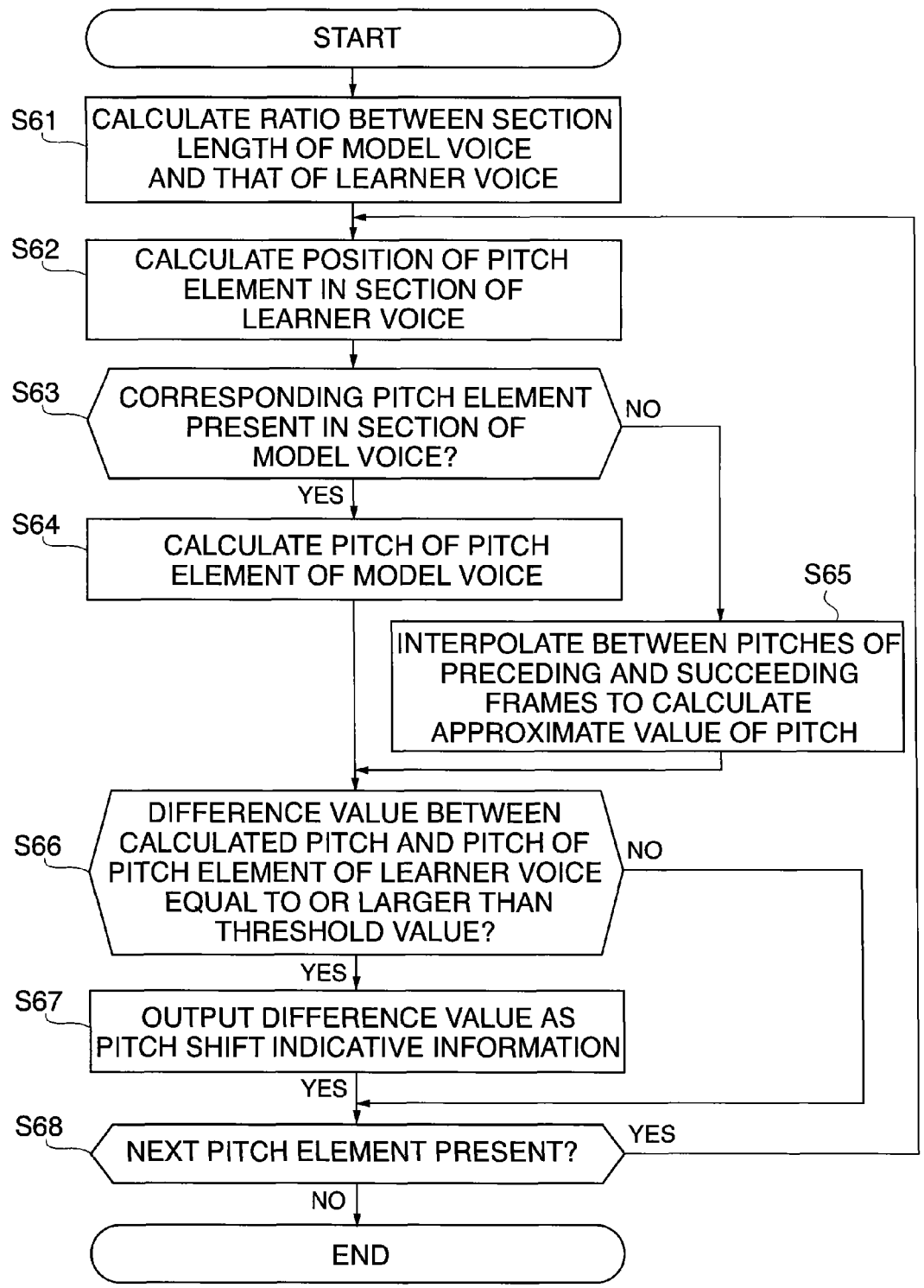
FIG. 6 is a flowchart showing the flow of a process executed by the CPU of the karaoke device.

As shown in FIG. 6, based on the correspondence relation between the model voice and the learner voice detected by the processing at the step S5, the CPU 11 calculates time points corresponding to the start times of respective sections represented by the delimitation data stored in the delimitation data storage area 14b, and calculates a ratio between the section length of each section of the model voice and the section length of a corresponding section of the learner voice (step S61). Specifically, in accordance with the delimitation data stored in the delimitation data storage area 14b and the correspondence relation between the model voice data and the learner voice data detected by the processing at the step S5, the CPU 11 associates each section of the model voice with the corresponding section of the learner voice, and calculates a ratio between the section length of each section of the model voice and that of the corresponding section of the learner voice.

Figure 7:
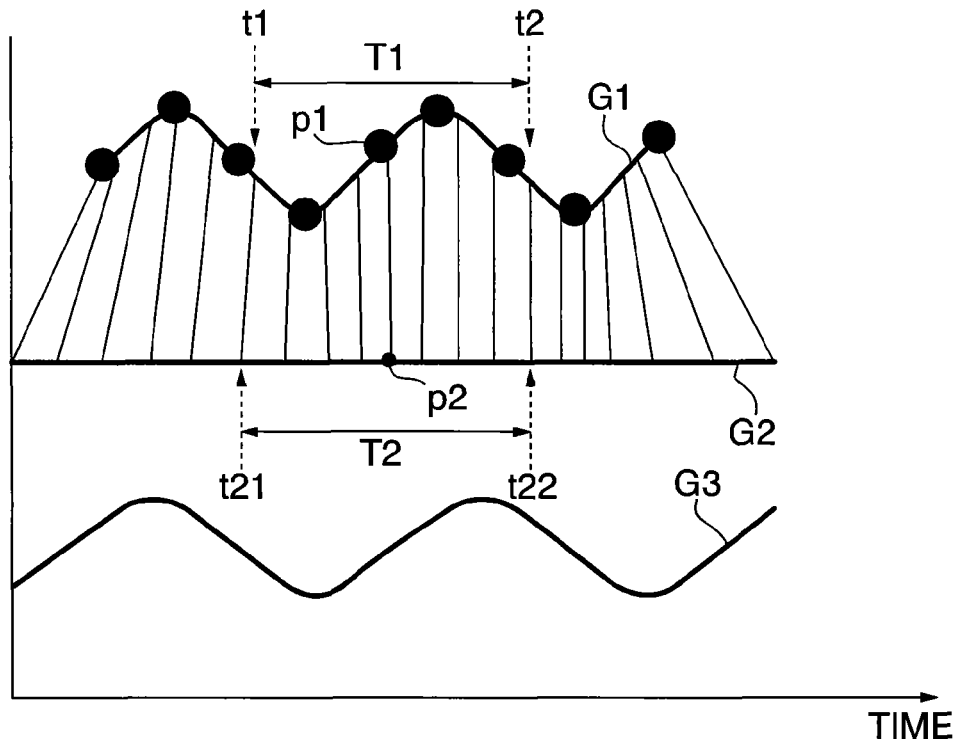
FIG. 7 is a view showing an example relation between model voice and learner voice.

In the following, a concrete example of the processing in the step S61 is described with reference to FIG. 7. In FIG. 7, a graph G1 is an example graph showing a time-based change in the pitch of the model voice, and a graph G2 is an example graph showing a time-based change in the pitch of the learner voice. In a case that delimiter positions of sections (start times of sections) represented by the delimitation data stored in the delimitation data storage area 14b are at t1 and t2 in FIG. 7, the CPU 11 calculates positions t21 and t22 in the learner voice corresponding to the delimiter positions represented by the delimitation data based on the correspondence relation detected in the step S5. Next, the CPU 11 calculates a ratio between the section length T1 from t1 to t2 and the section length T2 from t21 to t22.

Next, the CPU 11 calculates the position of one of pitch elements in one of sections of the learner voice (step S62). Subsequently, the CPU 11 identifies the correspondence positions of the model voice and the learner voice in the section in accordance with the ratio calculated in the step S61, and determines whether or not there is a pitch element of the model voice at a position (time point) corresponding to the position of the pitch element of the learner voice which is calculated in the step S62 (step S63). Specifically, for example, the CPU 11 performs proportional distribution with the ratio calculated in the step S61, thereby identifying the position of the model voice corresponding to the position of the pitch element calculated in the step S62. More specifically, assuming that the position of the model voice corresponding to position p1 of one pitch element in the learner voice is represented by p2 in the example in FIG. 7, the following relation is fulfilled:

$$T1:T2=(p1-t1):(p2-t21).$$

Thus, p2 is calculated in accordance with the following relation:

$$p2=t21+T2/T1(p1-t1).$$

In a case where it is determined at the step S63 that there is a pitch element at the corresponding position in the section of the model voice, i.e., in a case where a pitch is detected at that position in the model voice which corresponds to the position identified in the learner voice (YES to the step S63), the CPU 11 calculates a pitch of the corresponding pitch element of the model voice (step S64). On the other hand, if it is determined that there is no pitch element at the corresponding position in the section of model voice (NO to the step S63), the CPU 11 interpolates between the pitches of frames in the model voice which are close in position to the frame to be identified in the step S63, to calculate a pitch of that frame (step S65). The interpolation processing is performed by, e.g., linear interpolation.

Next, the CPU 11 determines whether or not a difference value between the pitch calculated in the step S64 or S65 and the pitch of the pitch element of the learner voice is equal to or larger than a threshold value (step S66). If it is determined that the difference is equal to or larger than the threshold value (YES to the step S66), the CPU 11 generates information indicative of the difference as pitch shift indicative information, and outputs the generated pitch shift indicative information (step S67). On the other hand, if it is determined at the step S66 that the difference is less than the threshold value, the CPU 11 does not generate the pitch shift indicative information, and proceeds to the processing in step S68. Next, the CPU 11 determines whether or not there is the next pitch element (step S68). If it is determined that there is the next pitch element (YES to the step S68), the CPU 11 returns to the processing of the step S62, and carries out the processing in the steps S62 to S67 for the next pitch element. On the other hand, if it is determined that there is no pitch element (NO to the step S68), the CPU 11 immediately completes the process.

Figure 8:
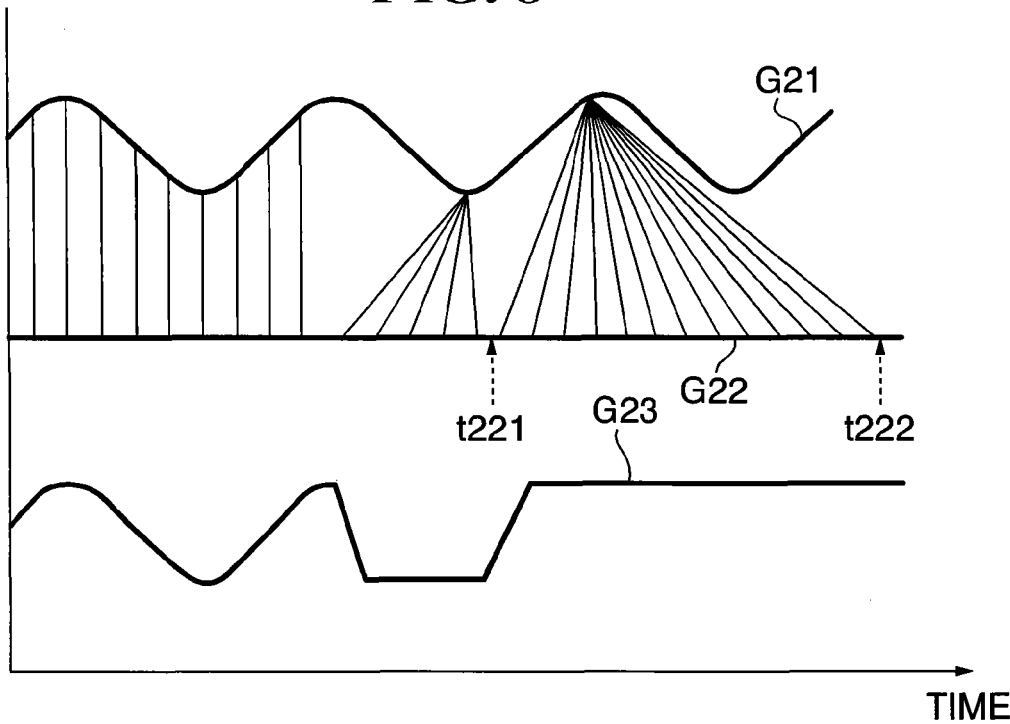
FIG. 8 is a view showing an example relation between model voice and learner voice.

Singing voice includes a part in which vocalization is sustained (for example, an end part of a phrase), and the vocalization content remains unchanged in the sustained part. Therefore, if the alignment (association) is carried out solely in accordance with the result of detection of correspondence points between the model voice and the learner voice, there may be a case where the alignment destination of the model voice shown by the graph G21 and the learner voice shown by the graph G22 varies, as shown for example in a section from a time point t221 to a time point t222 in FIG. 8. In that case, if the pitch shift is performed simply with reference to the pitch at the alignment destination, the processed pitch sometimes does not reflect a smooth change of the pitch of the model voice, as shown in a graph G23 in FIG. 8. On the other hand, in this embodiment, the CPU 11 performs the association in accordance with a ratio between section lengths, using the delimitation data stored in the delimitation data storage area 14b, thereby making it possible to carry out the pitch shift processing by which a smooth change of the model voice can be reflected as shown in graph G3 in FIG. 7.

If delimitations between syllables are only stored, but delimitations between phonemes are not stored, vocalization contents may be associated in accordance with a state of voice pitch extraction. This is because in most cases the pitch of a sustained vowel part is extracted, but the pitch of a consonant part is not extracted.

Figure 5:
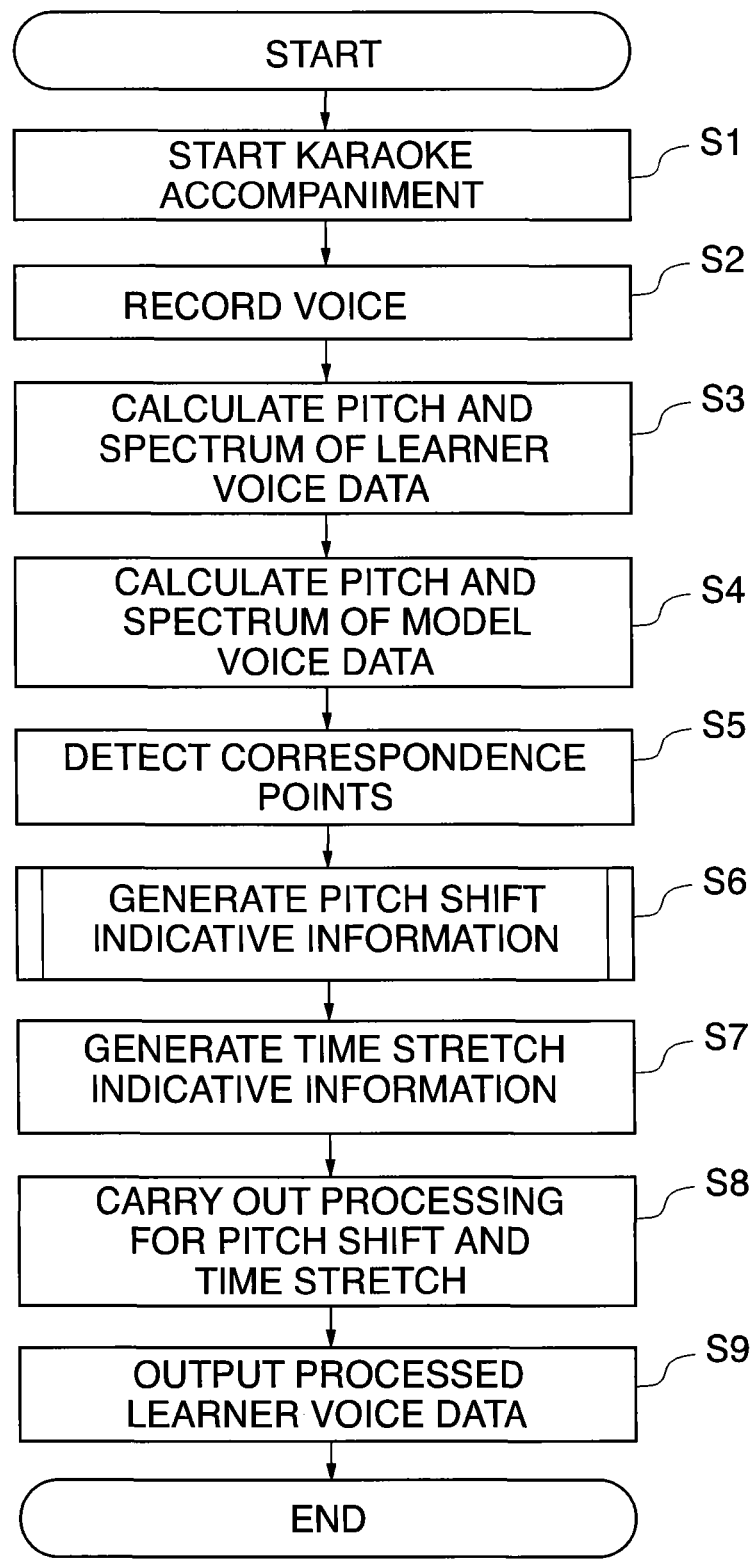
FIG. 5 is a flowchart showing the flow of a process executed by the CPU of the karaoke device.

Referring again to the description of FIG. 5, after completion of the pitch shift indicative information generating process (step S6), the CPU 11 carries out the processing of the time stretch indicative information generating section 113. Specifically, the CPU 11 generates time stretch indicative information for each frame based on the corresponding points and the delimitation data (step S7).

Next, the CPU 11 carries out the processing of the processing section 114. Specifically, the CPU 11 shifts the pitch of the learner voice data stored in the learner voice data storage area 14d so as to be coincident with the pitch of the model voice on the basis of the pitch shift indicative information, and compresses or extends a vocalization time of the learner voice in the time axis direction so as to be coincident with a vocalization time of the model voice on the basis of the time stretch indicative information, to thereby generate processed learner voice data (step S8).

In the step S8, the CPU 11 may perform the pitch shift processing and then perform the time stretch processing. Alternatively, the time stretch processing may be performed and then the pitch shift processing may be performed. Further alternatively, the pitch shift processing and the time stretch processing may be performed concurrently on the learner voice data in time series.

The CPU 11 outputs the generated processed learner voice data to the voice processing section 18 (step S9). The voice processing section 18 converts the processed learner voice data into an analog signal for sound emission from the loudspeaker 19.

As described above, the learner voice data is subjected to the pitch shift processing to thereby make it possible to reflect on the learner voice various techniques used in the model voice, such as "vibrato" for producing a vibrating tone color by continuously slightly increasing and decreasing the pitch, and "crescendo" (translated as "shakuri" in Japanese) for vocalizing a voice lower in pitch than the intended voice and then smoothly changing the tone interval toward the intended voice. Also, the learner voice data is subjected to the time stretch processing, making it possible to correct a deviation in vocalization timing of the learner and to reflect, on the learner voice, techniques in the model voice such as so-called "penetration" and "accumulation" (translated as "tsukkomi" and "tame" in Japanese) for intentionally deviating the start or end of singing. Since the output voice is the same in quality as the learner's voice, the learner hearing the emitted voice can have the image in which the learner correctly sings a song.

<C: Modifications>

In the above, one embodiment of this invention has been described. This invention is not limited to the embodiment, and may be embodied in various other forms, examples of which are described below.

(1) In the above embodiment, an example case of supporting the learner's singing practice has been described. However, this is not limitative, and a learner's musical instrument practice may be supported. In that case, the accompaniment/lyric data storage area 14a stores performance data of musical instruments (e.g., base and drum) other than a musical instrument (e.g., guitar) which the learner wishes to practice, the model voice data storage area 14c stores model performance data, and the learner voice data storage area 14d stores performance data representing the learner's performance sound. The learner plays a musical instrument which he/she wishes to practice, and the learner's performance sound is picked up by the microphone 17 and converted into a voice signal, which is converted into a digital signal by the voice processing section 18 and then stored into the learner voice data storage area 14d. The delimitation data storage area 14b also stores information representing delimiter positions, such as start time points and end time points of sounds contained in performance sound represented by model voice data. Based on these data, the CPU 11 performs processing similar to the above described processing to thereby generate processed learner voice data for sound emission.

(2) In the embodiment, so-called karaoke singing is performed for which lyrics are displayed at the time of storing the learner voice data and the accompaniment data are reproduced while the learner sings a song, but this is not limitative. The learner may sing a song, without lyrics being displayed and accompaniment data being reproduced, and recording may be performed for generation of processed learner data.

(3) In the embodiment, model voice data is stored in the model voice data storage area 14c, and the model voice data is read out by the CPU 11 of the karaoke device 1 from the storage section 14. Alternatively, the model voice data may be received via a communication network.

Instead of the model voice data per se being stored, data representing the pitch and spectrum of model voice may be stored. In that case, the CPU of the karaoke device does not perform processing for calculating the pitch and spectrum of the model voice, but performs the detection of correspondence points, the pitch shift processing, and the time stretch processing on the basis of the pitch data and spectrum data stored in the storage section.

In the above embodiment, a learner's voice is picked up by the microphone 17 and learner voice data is generated by the voice processing section 18. Alternatively, the learner voice data may be received via a communication network, or may be input via an interface such as USB (Universal Serial Bus). In brief, any arrangement may be used so long as the learner voice data is supplied to the CPU of the karaoke device.

(4) In the embodiment, information representing start time points of syllables are used as delimiter information. However, the delimiter information is not limited to start time points of syllables, but may be information that represents start time points and end time points of syllables, or may be information that represents start time points and end time points of groups each including, e.g., a predetermined number of musical notes. In brief, the delimiter information may be any information representing delimiter positions of predetermined sections such as syllables, musical notes, and phrases.

(5) When singing a song not fitting the user's vocal range, the user sometimes uses key control. In that case, since the key of correct voice also changes, the key of a voice to be fed back to the user should be changed so as to fit the key control. Thus, the CPU accepts key control data representing the content of the key control via the operating section, shifts the pitch of the model voice data in accordance with the content of the input key control data, and stores the model voice data shifted in pitch into the storage section.

In the processing performed by the CPU 11 to generate the pitch shift indicative information, the CPU 11 may accept the input of key control data representing the content of key control via the operating section 16 (as shown by a dotted line in FIG. 2), and may generate the pitch shift indicative information in consideration of the content represented by the input key control data. Specifically, the CPU 11 generates, as the pitch shift indicative information, the sum of a difference between the pitch of the model voice and that of the learner voice and a value represented by the key control data.

This also applies to the time stretch processing. In the processing performed by the CPU 11 to generate the time stretch indicative information, the CPU 11 may accept, via the operating section 16, the input of tempo control data representing the content of tempo control (as shown by a dotted line in FIG. 2), may perform the time stretching processing for compressing or extending model voice data in the time axis direction in accordance with the content represented by the input tempo control data, and may generate the time stretch indicative information in accordance with the model voice data subjected to the time stretch processing and the learner voice data.

(6) In the embodiment, when determining whether or not pitch shift indicative information should be generated, the CPU 11 performs comparison with the predetermined threshold as shown in step S66 in FIG. 6, but this is not limitative. For example, the determination as to whether pitch shift indicative information should be generated may not be performed.

(7) In the above embodiment, the karaoke device 1 realizes all the functions shown in FIG. 2. Alternatively, there may be provided two or more apparatuses which are connected with each other via a communication network and to which the functions are individually assigned, such that the karaoke device 1 of the embodiment is realized by a system comprised of these apparatuses. For example, the system may be configured by a computer apparatus and a server apparatus which are connected via a communication network. The computer apparatus may include a microphone, a loudspeaker, a display unit, and an input unit. The server apparatus may be adapted to realize the basic analysis section 111, the pitch shift indicative information generating section 112, the time stretch indicative information generating section 113, the processing section 114, and the output section 115. In that case, the computer apparatus may convert voice input from the microphone into voice data, and may transmit the voice data to the server apparatus. The server apparatus may process learner voice data on the basis of the received voice data, the model voice data, and the delimitation data, and may transmit the generated processed learner voice data to the computer apparatus.

(8) The program executed by the CPU 11 of the karaoke device 1 of the embodiment may be provided in the form of being stored in a storage medium such as a magnetic tape, a magnetic disk, a flexible disk, an optical recording medium, an optomagnetic recording medium, a CD (Compact Disk)-ROM, a DVD (Digital Versatile Disk), or a RAM. The program may also be downloaded into the karaoke device 1 via a network such as the Internet.

It is to be understood that the object of the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium.

In that case, the program code itself read from the storage medium realizes the functions of the above described embodiment, and therefore the program code and the storage medium in which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

INDUSTRIAL APPLICABILITY

According to the song practice support device of this invention, a singer is able to auditorily recognize how to change the way of singing.

The invention claimed is:
1. A song practice support device comprising:
association means for associating model voice data stored beforehand and input learner voice data with each other in a time axis direction;
storage means for storing delimiter information representative of delimiter positions defining predetermined sections of the model voice data in the time axis direction;
section length ratio calculation means for associating the model voice data with the learner voice data on a section basis in accordance with the delimiter information stored in said storage means and the result of association by said association means and for calculating, on a section basis, a ratio between the section length of a model voice represented by the model voice data and the section length of a learner voice represented by the learner voice data;
correspondence point identification means for identifying, on a frame basis with a frame having a predetermined time length, correspondence points between the model voice and learner voice for respective sections in accordance with the ratio calculated by said section length ratio calculation means;
pitch shift means for shifting a pitch of the learner voice represented by the input learner voice data so as to be coincident with a corresponding pitch of the model voice data in accordance with a result of association by said association identification by said correspondence point identification means;
time stretching means for compressing or extending a predetermined section of the learner voice data in the time axis direction so that a section length thereof is made to coincide with a corresponding section length of the model voice data in accordance with the result of association by said association means; and output means for outputting to sound emission means the learner voice data shifted in pitch by said pitch shift means and compressed or extended in the time axis direction by said time stretching means, wherein in accordance with the result of identification by said correspondence point identification means, said pitch shift means shifts the pitch of the learner voice in respect of a frame in which the pitch of the learner voice corresponding to the pitch of the model voice is detected, so as to be coincident with the corresponding pitch of the model voice, and said pitch shift means interpolates between the pitches of frames close to a frame in which the pitch of the model voice is not detected, to thereby determine the pitch of the model voice for that frame.

2. A control method for a song practice support device, comprising:

an association step of associating model voice data stored beforehand and input learner voice data with each other in a time axis direction;

a storage step of storing delimiter information representative of delimiter positions defining predetermined sections of the model voice data in the time axis direction;

a section length ratio calculation step of associating the model voice data with the learner voice data on a section basis in accordance with the delimiter information stored in said storage step and the result of association in said association step and of calculating, on a section basis, a ratio between the section length of a model voice represented by the model voice data and the section length of a learner voice represented by the learner voice data;

a correspondence point identification step of identifying, on a frame basis with a frame having a predetermined time length, correspondence points between the model voice and learner voice for respective sections in accordance with the ratio calculated in said section length ratio calculation step;

a pitch shift step of shifting a pitch of the learner voice represented by the input learner voice data so as to be coincident with a corresponding pitch of the model voice data in accordance with a result of association in said association identification in said correspondence point identification step;

a time stretching step of compressing or extending a predetermined section of the learner voice data in the time axis direction so that a section length thereof is made to coincide with a corresponding section length of the model voice data in accordance with the result of association in said association step; and an output step of outputting to sound emission means the learner voice data shifted in pitch in said pitch shift step and compressed or extended in the time axis direction in said time stretching step, wherein in accordance with the result of identification in said correspondence point identification step, the pitch of the learner voice in respect of a frame in which the pitch of the learner voice corresponding to the pitch of the model voice is detected is shifted in said pitch shift step so as to be coincident with the corresponding pitch of the model voice, and interpolation is performed between the pitches of frames close to a frame in which the pitch of the model voice is not detected to thereby determine the pitch of the model voice for that frame, and wherein said steps are implemented at least in part by a computer.

3. A non-transitory computer-readable storage medium storing a program, that when executed by a computer, causes the computer to execute a control method for controlling a song practice support device, the control method comprising:

an association step of associating model voice data stored beforehand and input learner voice data with each other in a time axis direction;

a storage step of storing delimiter information representative of delimiter positions defining predetermined sections of the model voice data in the time axis direction;

a section length ratio calculation step of associating the model voice data with the learner voice data on a section basis in accordance with the delimiter information stored in said storage step and the result of association in said association step and of calculating, on a section basis, a ratio between the section length of a model voice represented by the model voice data and the section length of a learner voice represented by the learner voice data;

a correspondence point identification step of identifying, on a frame basis with a frame having a predetermined time length, correspondence points between the model voice and learner voice for respective sections in accordance with the ratio calculated in said section length ratio calculation step;

a pitch shift step of shifting a pitch of the learner voice represented by the input learner voice data so as to be coincident with a corresponding pitch of the model voice data in accordance with a result of association in said association identification in said correspondence point identification step;

a time stretching step of compressing or extending a predetermined section of the learner voice data in the time axis direction so that a section length thereof is made to coincide with a corresponding section length of the model voice data in accordance with the result of association in said association step; and an output step of outputting to sound emission means the learner voice data shifted in pitch in said pitch shift step and compressed or extended in the time axis direction in said time stretching step, wherein in accordance with the result of identification in said correspondence point identification step, the pitch of the learner voice in respect of a frame in which the pitch of the learner voice corresponding to the pitch of the model voice is detected is shifted in said pitch shift step so as to be coincident with the corresponding pitch of the model voice, and interpolation is performed between the pitches of frames close to a frame in which the pitch of the model voice is not detected to thereby determine the pitch of the model voice for that frame.

* * * * *